A. M. YEAKEL.
CLOCK.
APPLICATION FILED NOV. 24, 1909.

948,912.

Patented Feb. 8, 1910.

WITNESSES
P. F. Nagle.
L. Douville.

INVENTOR
Abraham M. Yeakel.
BY
Diederheim & Fairbanks
ATTORNEYS

UNITED STATES PATENT OFFICE.

ABRAHAM M. YEAKEL, OF PERKASIE, PENNSYLVANIA, ASSIGNOR OF ONE-HALF TO WILSON L. YEAKEL, OF PERKASIE, PENNSYLVANIA.

CLOCK.

948,912.      Specification of Letters Patent.      Patented Feb. 8, 1910.

Application filed November 24, 1909. Serial No. 529,673.

*To all whom it may concern:*

Be it known that I, ABRAHAM M. YEAKEL, a citizen of the United States, residing at Perkasie, county of Bucks, State of Pennsylvania, have invented a new and useful Clock, of which the following is a specification.

My invention consists of an improvement in clocks, embodying means for adjustably supporting the shafts of the wheels of the train, so as to set the same properly and provide for the wear of the shafts and bearings thereof, for taking up lost motion and adapt the shafts to be removed readily and reapplied easily, without disturbing or disintegrating the frame of the clock.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 1:
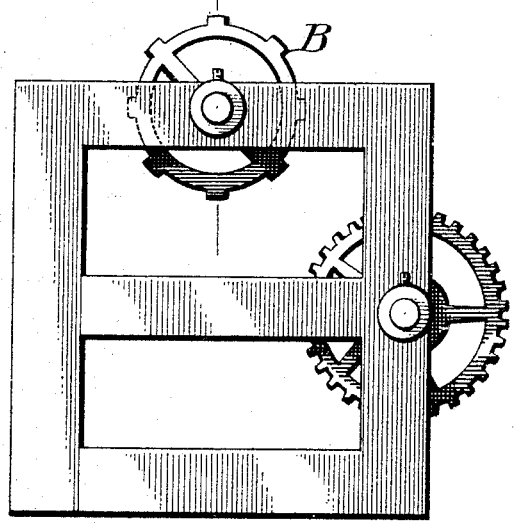
Figure 2:
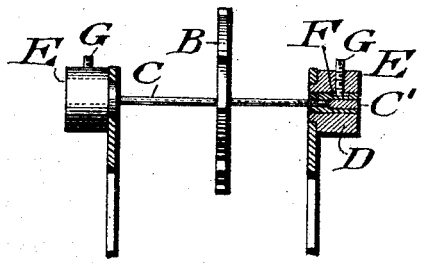
Figure 3:
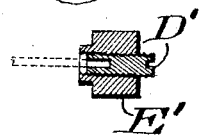

Figure 1 represents a side elevation of a portion of a clock embodying my invention. Fig. 2 represents a partial side elevation and partial section of a portion on line x—x, Fig. 1. Fig. 3 represents a section of a portion of a modification.

Similar letters of reference indicate corresponding parts in the figures.

Referring to the drawings:—A designates the frame of a clock, and B designates the balance wheel of the train, the shaft C thereof having its ends mounted in the bushings D, the latter being contained movably in collars E, which are firmly secured to the frame in openings therein. The ends of the shaft C which enter the bushings D rest against plugs C', which partially occupy the bores or openings of the bushings and form thrust-bearings for said ends.

In the peripheries of the bushings are longitudinally extending slots F, in the bases of which are received the points of the set screws G, which are fitted in the collars and serve to hold said bushings in set position according to requirements of the shaft, and when the latter is adjusted, the screws G are tightened, the effect of which is evident. As the ends of the shaft are worn, or the shaft is to be adjusted, the screws are loosened, and the bushings moved to the required extent, when the screws are again tightened, thus adjusting the shaft or taking up the lost motion thereof, and causing regularity in the rotation of the shaft and of the wheels of the train. Furthermore, when the screws are loosened, the bushings may be withdrawn from the collars, whereby the shaft is released, and said shaft and the wheel B may be readily removed from the frame without disturbing or disintegrating the members of the latter, and afterward easily reapplied to said frame.

In Fig. 3, I show a bushing D' in lieu of the bushing D, the same being exteriorly threaded and engaging with threads on the bore of the collar E', so that said bushing may be screwed in and out, and thus be adapted for the adjustment and take-up of the shaft, and the removal and reapplication of the latter. The plugs C' are likewise adjustable in the bushings relatively to the requirements of the shaft C, and may be removed to assist in displacing said shaft and the wheel thereon, as is evident.

Having thus described my invention, what I claim as new and desire to secure by Letters Patent, is:—

1. In a clock, a wheel of the train thereof, a shaft carrying said wheel, a bushing for said shaft, a collar, the latter being supported on the frame of the clock and adjustably containing said bushing, and a screw on said collar adapted to engage said bushing.

2. In a clock, a wheel of the train thereof, a shaft carrying said wheel, a collar supported on the frame of the clock, a bushing adjustably contained in said collar and having said shaft mounted therein, and a set screw on said collar adapted to engage said bushing.

3. In a clock, a wheel of the train thereof, a shaft carrying said wheel, a collar supported on the frame of the clock, a bushing adjustably contained in said collar, and having said shaft mounted therein, and a set screw on said collar adapted to engage said bushing, said bushing having on its exterior a longitudinally extending slot receiving the point of said screw.

ABRAHAM M. YEAKEL.

Witnesses:
JOHN A. WIEDERSHEIM,
HARRY C. DALTON.